US012477264B2

(12) United States Patent
Hock Ho

(10) Patent No.: US 12,477,264 B2
(45) Date of Patent: Nov. 18, 2025

(54) HEADPHONE EARPIECE WITH MODULAR CONTROL WHEEL

(71) Applicant: Bang & Olufsen A/S, Struer (DK)

(72) Inventor: Tee Hock Ho, Singapore (SG)

(73) Assignee: Bang & Olufsen A/S, Struer (DK)

( * ) Notice: Subject to any disclaimer, the term of this patent is extended or adjusted under 35 U.S.C. 154(b) by 191 days.

(21) Appl. No.: 17/937,214

(22) Filed: Sep. 30, 2022

(65) Prior Publication Data

US 2024/0114280 A1 Apr. 4, 2024

(51) Int. Cl.
*H04R 1/10* (2006.01)

(52) U.S. Cl.
CPC ......... *H04R 1/1041* (2013.01); *H04R 1/1008* (2013.01); *H04R 1/1025* (2013.01); *H04R 2430/01* (2013.01)

(58) Field of Classification Search
CPC ......................... H04R 2420/07; H04R 1/1041; H04R 1/1066; H04R 5/0335; H04R 1/02; H04R 25/602; H04R 1/10; H04R 2225/61; H04R 2430/01; H04R 2201/02; H04R 1/1008; H04R 1/1025
USPC .......... 381/322, 323, 334, 74, 384, 386, 374
See application file for complete search history.

(56) References Cited

U.S. PATENT DOCUMENTS 3,902,120 A * 8/1975 Dascal .................. H04R 5/033 455/343.1
5,674,076 A * 10/1997 Billings ................... G10H 1/34 381/345
8,953,815 B2 2/2015 Shinozaki
9,288,568 B2 3/2016 Boyajian et al.
9,467,767 B2 * 10/2016 Chen ...................... H04R 5/033
10,271,031 B2 4/2019 Jannard et al.
2006/0039574 A1 2/2006 Chen
2008/0180874 A1 7/2008 Gauger et al.
2009/0268935 A1 * 10/2009 Dillinger .............. H04R 1/1075 381/371
2010/0141606 A1 * 6/2010 Bae ......................... G06F 3/016 345/173
2014/0036127 A1 * 2/2014 Pong ...................... H04N 23/66 348/333.01

(Continued)

FOREIGN PATENT DOCUMENTS

CN 203872321 * 10/2014
CN 213426434 * 6/2021

(Continued)

*Primary Examiner* — Norman Yu
(74) *Attorney, Agent, or Firm* — Patterson + Sheridan, LLP

(57) ABSTRACT

The present disclosure relates to a headphone with noise-cancelling capabilities. More specifically, the present disclosure relates to replaceable and serviceable headphone batteries, without extensive dismantling or replacement of the headphone. The headphone may have a volume wheel that is located on the back of the ear-piece. The volume when may be turned clock-wise or counter clock-wise to increase, or decrease the volume, respectively. In contact with the volume wheel, the battery pack may be placed in a pocket or opening within the earpiece. The volume wheel may be a modular, standalone component, so that once removed from the ear-piece, the battery pack may be replaced from the external, rather than requiring removal of several components to reach the battery pack located internally.

14 Claims, 8 Drawing Sheets

(56) References Cited

U.S. PATENT DOCUMENTS

| | | | |
|---|---|---|---|
| 2015/0063586 | A1 | 3/2015 | Shah |
| 2018/0014972 | A1 | 1/2018 | Fletcher et al. |
| 2018/0217382 | A1 | 8/2018 | Urbach et al. |

FOREIGN PATENT DOCUMENTS

| | | | |
|---|---|---|---|
| CN | 214898737 | U | 11/2021 |
| EP | 3972282 | A1 | 3/2022 |

* cited by examiner

HEADPHONE EARPIECE WITH MODULAR CONTROL WHEEL

TECHNICAL FIELD

Embodiments of the present disclosure relate generally to audio headphones. In particular, the present disclosure relates to headphones having removable batteries.

BACKGROUND

Headphones and headsets are used to play audio for users of electronic devices. Headphones come in a variety of types, styles, and forms. Most conventional models of headphones are either in-ear, on-ear, or over-ear headphones. Each type of headphone may have noise-cancelling abilities to suppress ambient noise, distractions, or other undesired sounds. Conventional headphones typically have fixed rechargeable batteries, though some may be compatible with single-use, replaceable batteries (e.g., alkaline).

In most cases, headphones include an earpiece for a right ear and another earpiece for a left ear, with a speaker system built into each earpiece. In-ear headphones may have a headband or other mounting system that allows a user to wear the headphones on their head with the earpieces making contact with their ears. In-ear headphones, on the other hand, may have a cord to connect the earpieces to a power source, or, they may be wireless and connect via a short-range wireless-communication protocol (e.g., Bluetooth™) to a sound source.

For over-ear headphones, the earpiece may have a cushion or soft portion that makes contact with the user's ear or head, a front housing that protects the batteries and cables of the speaker system, and a base or mounting portion where the battery is located and where the earpiece connects with a band to be worn around the head. Many over-ear headphones also have a manual volume control to increase or decrease the volume of the audio played through the headphones. In cases in which the battery requires service, gaining access typically requires removing the cushion, removing the front-housing assembly to access the battery, and removing other cables and components in order to reach the battery itself. Special tools are often required to open the headphone housing, or to reach the battery from underneath the adhesive or other material retaining it in place. In other words, this process typically requires expert service by the manufacturer or a trained service provider, and cannot be carried out by a casual user.

Rechargeable batteries have a limited useful lifespan, typically 2-3 years or less depending on the consistency and duration of use and recharging. Certain features and uses also can reduce a battery's lifecycle, and drain the battery much quicker while in use. For instance, listening to audio at high volumes, and active noise-cancelling are a few of the many features that can contribute to a shorter battery lifecycle. Once a headphone battery is no longer effectively rechargeable, it must either be replaced, or the headphones must be discarded and a new pair must be purchased. Many users expect or desire a longer lifespan from their headphones for cost and/or environmental reasons. Conventionally, the replacement and serviceability of a headphone component like the battery has been time-consuming, requiring an extensive amount of dismantling in order to reach the battery, as previously discussed. Accordingly, it has been neither practical nor cost-effective.

Further, the majority of wireless headsets use lithium-ion batteries that are integrated into the design of the headphone to make it more sleek and compact. When the batteries are fully integrated into the headphone, they are ordinarily not replaceable without risking damage to the device in the process of removing the battery. Accordingly, removing a dead or damaged battery to service or replace it has not been a simple task. Due to the difficulty of removing the battery from the headphones, most users are left with only one option-purchasing a new device.

SUMMARY

The present disclosure relates to a headphone with a removable battery that may be easily accessed for service or replacement. In one aspect, the headphone may have a modular control wheel that is located on the back of the earpiece. For instance, the control wheel may be rotated clockwise or counterclockwise to increase or decrease the volume. In some examples, the earpiece defines a pocket or cavity to retain the battery. While disposed within the cavity, the battery can be in contact with the control wheel. The control wheel may be a modular, standalone component such that, when the control wheel is removed from the earpiece, the battery pack may be conveniently replaced externally from the earpiece housing, rather than requiring removal of several additional components from the earpiece housing to reach the battery pack.

In some examples, the modular control wheel may be removably attached to the earpiece using a "screw and hook" method. For instance, the earpiece of the headphone may have a removable screw concealed under an arm of the headband. Within the earpiece, a hook may be used to hold the control wheel module in place. After removing the screw, the control wheel can be rotated and dislodged from the bottom hook connecting the control wheel module to the earpiece. The screw on the housing of the earpiece may be either externally or internally positioned according to different designs. The hook may latch onto a stationary latch or loop within the housing of the earpiece, and is configured to detach from the latch or loop when the control wheel module is rotated.

In some examples, the control wheel may be attached to the earpiece using one or more magnets, and one or more metal pins. The magnetic attractive force between the one or more magnets and the one or more metal pins retains the control wheel in place. Similar to the example referenced above, the battery pack may be housed within the control wheel. To remove the control wheel, a user need only "unplug" the control wheel module from the earpiece, separating the one or more magnets from the one or more metal pins. Each of the one or more metal pins may have a wing protrusion to lock the control wheel into place, thereby preventing it from turning.

In some examples, the earpiece includes a bayonet-type coupling mechanism. In such examples, one or more bayonet grips located on the control wheel may be positioned into corresponding slots or grooves located on the earpiece. The connection is made by twisting and compressing one component into the other (i.e., a "press and twist" connection). Precise alignment of the tight-tolerance pieces ensures that the face of the control wheel module is parallel to, and flush against, the surface of the earpiece. To remove the control wheel, a user may press on the flat surface of the control wheel and simultaneously twist the control wheel to dislodge it, thereby disconnecting it from the base of the earpiece.

In some examples, a screw that is shorter in length may be inserted into the side of the front housing of the earpiece.

The screw may be located on the external surface of the front housing for convenient access and removal. The screw may be inserted into a corresponding groove or slot on the perimeter of the front housing, thereby locking the control wheel module into place on the front housing of the earpiece. To remove the control wheel module, the user need only use a screwdriver or other suitable tool to remove the screw from the front housing, and unlock the control wheel from the front housing of the earpiece.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
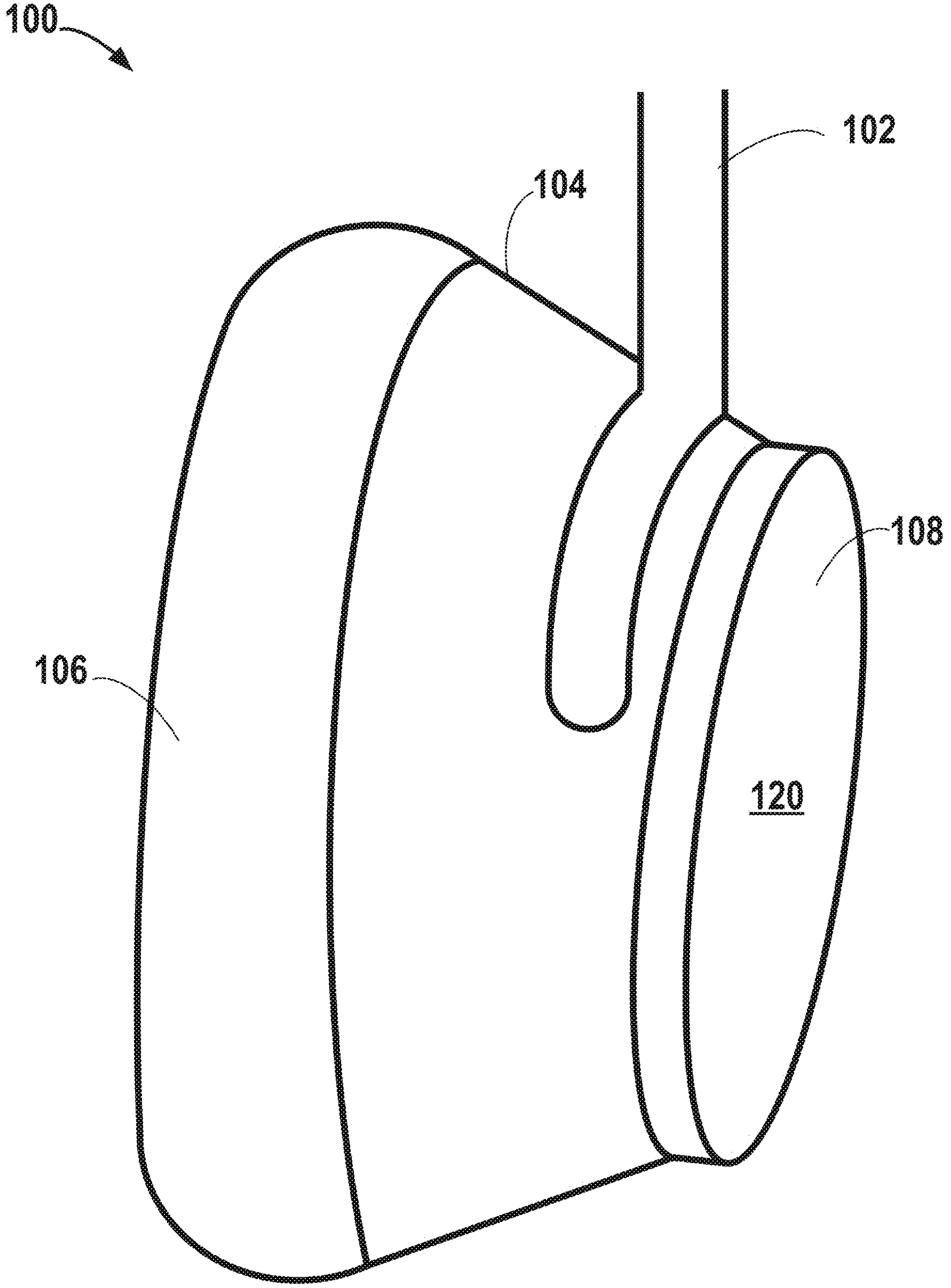
FIG. 1 is a perspective view of an earpiece for a pair of headphones.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure is directed to structures and methods for the serviceability of headphone devices, e.g., to service and/or replace a battery or other components. In some examples, serviceability and replacement may be achieved via a modular control wheel that is removably attached to the headphone housing. The control wheel may be a stand-alone component of the headphone, and removably attachable thereto using various methods. The control wheel may be a volume control, a noise-canceling feature, or another feature related to use of the headphones.

Figure 2:
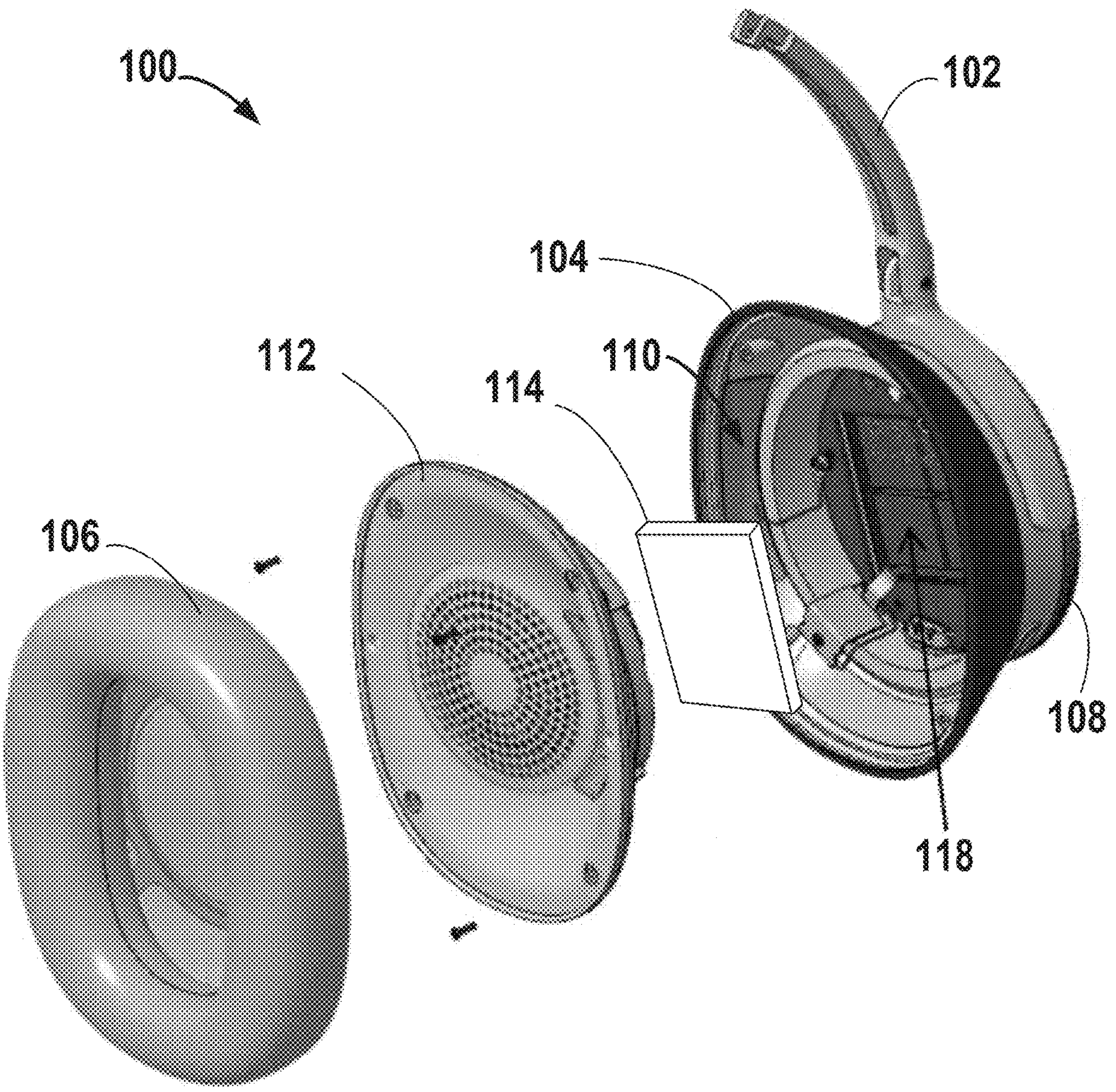
FIG. 2 is an exploded view of the earpiece of FIG. 1.

FIG. 1 is a perspective view, and FIG. 2 is an exploded view, illustrating an earpiece 100 for a pair of audio headphones. Although not shown in FIG. 1 or 2, a second earpiece is understood to be coupled to earpiece 100 via headband 102, and can include any or all of the same features described with respect to earpiece 100. As shown in FIGS. 1 and 2, earpiece 100 includes at least a housing 104, an ear cushion 106, and a modular control wheel 108. As shown in FIG. 2, housing 104 defines an internal cavity 110 configured to house and retain a speaker unit 112, a removable battery 114, and other electronic components of earpiece 100.

In accordance with techniques of this disclosure, earpiece 100 includes a modular control wheel 108. Control wheel 108 is configured to provide dual functionality. First, control wheel 108 defines a user-input mechanism, enabling manual control over an audio function of earpiece 100, such as volume, noise-cancelation, or the like. For instance, control wheel 108 is configured to rotate in clockwise and counter-clockwise directions relative to housing 104 in order to increase/decrease the volume, adjust the active noise-cancelling functions, adjust the transparency mode level, or other functions, as assigned by suitable software. In some examples, control wheel module 108 may include a decoder disk that transfers a mechanical rotation into a signal to be sensed by a sensor on the printed circuit board assembly, e.g., of the electrical components within housing 104. Additionally or alternatively, an exterior surface of control wheel 108 may be touch-sensitive, enabling several touch-based user-input functions, such as a single tap, a double tap, press-and-hold, swipe up/down, swipe left/right, and other suitable touch patterns. Each touch pattern may be programmably assigned to a different function.

Second, control wheel 108 includes a removable-attachment mechanism for convenient removal from the rest of housing 104, thereby providing non-destructive access to the internal components of housing 104. In this way, a user may access and repair or replace battery 114 or another internal component of housing 104, as needed.

Figure 3:
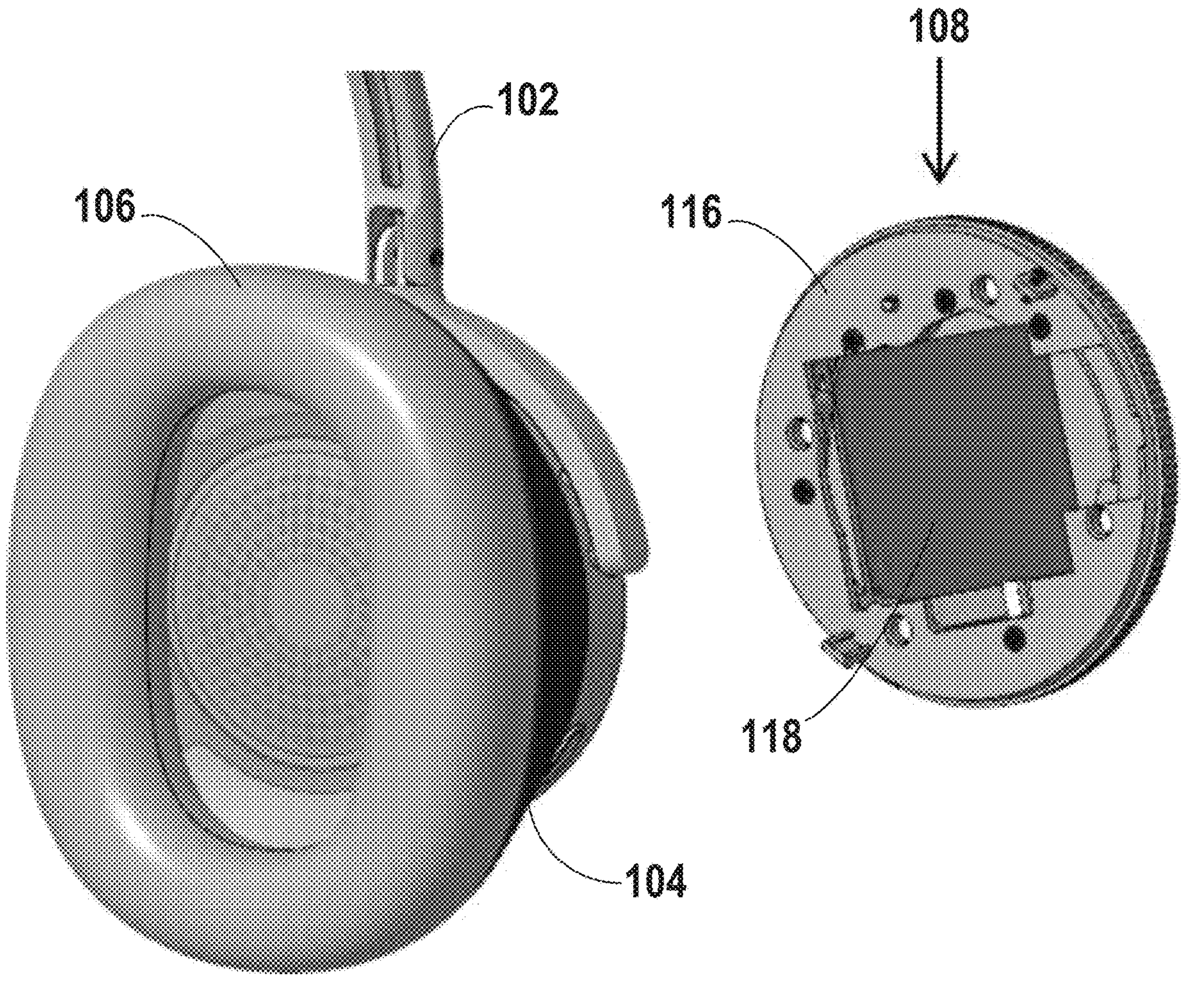
FIG. 3 is a perspective view of the earpiece of FIGS. 1 and 2 with a modular control wheel removed.

In some examples, such as the example shown in FIGS. 2 and 3, but not all examples, an interior side 116 of control wheel 108 defines a pocket or recess 118 configured to retain removable battery 114. For instance, a removable control wheel 108 on each of the left and right earpieces 100 can incorporate a respective battery 114. In such cases, when one battery 114 is at low capacity or damaged, or at diminished capacity, the second battery pack may be used to continue functionality of the headphones while the first battery is recharged or replaced. As another example, while the removable battery 114 is retained within control wheel 108, control wheel 108 can function as a remote control for earpiece 100 after being removed from housing 104. In other examples, such as the example shown in FIG. 6A, an external side of housing 104 can define the recess configured to retain battery 114.

Figure 4A:
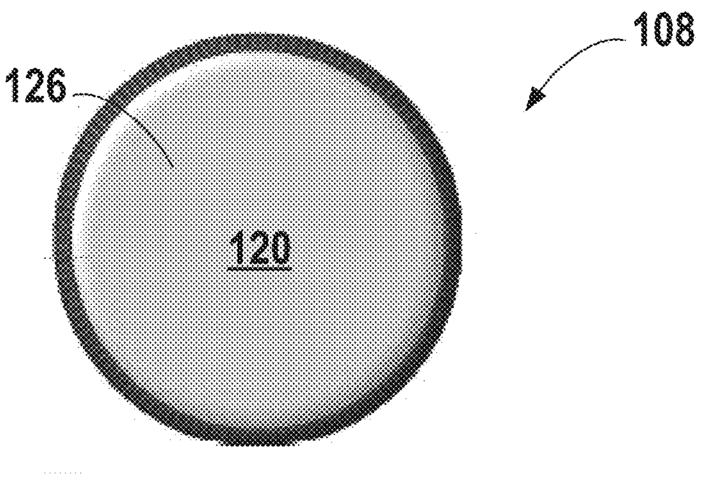
FIG. 4A is a front view of a modular control wheel of FIG. 3.
Figure 4B:
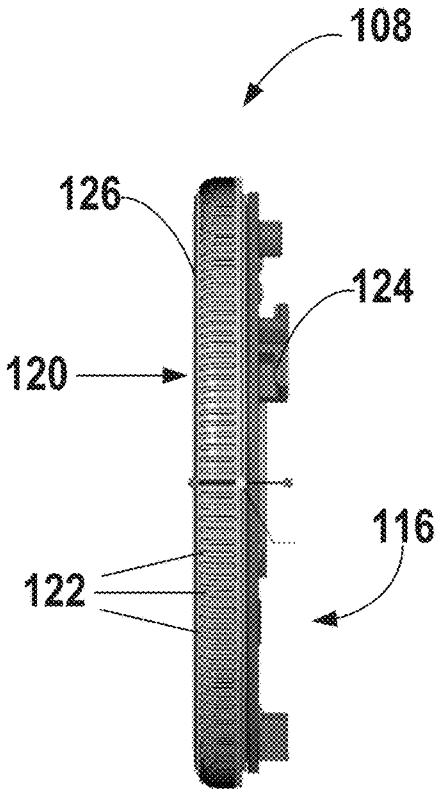
FIG. 4B is a side view of the modular control wheel of FIG. 4A.
Figure 4C:
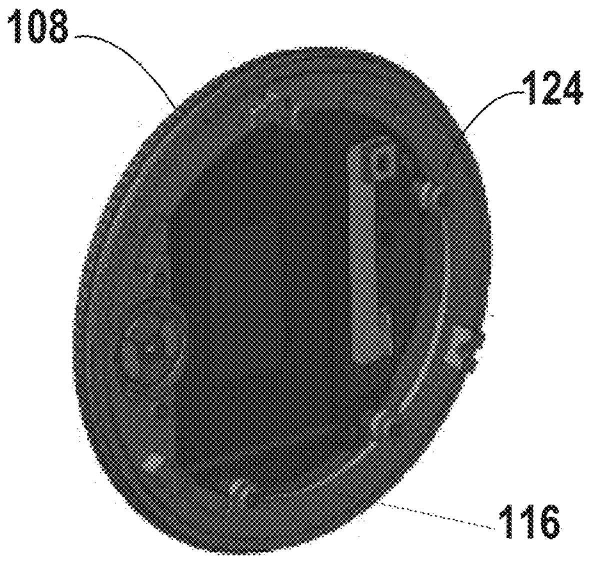
FIG. 4C. is a rear-perspective view of the modular control wheel of FIGS. 4A and 4B.

FIG. 4A is a front view of an exterior side 120 of control wheel 108, FIG. 4B is a side view of control wheel 108, and FIG. 4C is a perspective view of the interior side 116 of control wheel 108. Control wheel 108 is shown in FIGS.

4A-4C to be substantially circular, but in other examples, may be more ovular or have any other suitable geometric shape. As shown in FIG. 4B, control wheel 108 may have ridges or grooves 122 around the perimeter to facilitate better friction or grip of a user's fingers while rotating control wheel 108 clockwise and counterclockwise relative to the rest of housing 104. In some examples, control wheel 108 is both an input device and an output device. As referenced above, exterior surface 120 can include a touch-sensitive user-input surface. Additionally or alternatively, control wheel 108 can be configured to provide haptic feedback in response to certain conditions.

As illustrated in FIG. 4B, control wheel 108 includes two distinct components, wheel body 124, and wheel disc 126. Wheel body 124 defines interior surface 116 and is configured to removably couple to the external side of housing 104. Wheel disc 126 defines exterior surface 120 and circumferential grooves 122. Wheel disc 126 is configured to remain stationary. Wheel body 124 mates with housing 104, and may act as the stationary base for rotating control wheel 108. When wheel body 124 is coupled to housing 104, control wheel 108 rotates while wheel body 124 and housing 104 remain stationary, to generate user input, e.g., to control audio volume or another function of earpiece 100.

As referenced above, earpiece 100 includes at least one attachment mechanism enabling a user to removably attach control wheel 108 to the rest of housing 104, and detach control wheel 108 from housing 104, as desired. FIGS. 5A-8B illustrate four such attachment mechanisms. It is to be understood that the following example attachment mechanisms are in no way intended to be limiting nor mutually exclusive—any two or more removable-attachment mechanisms may be used in combination with one another.

Figure 5A:
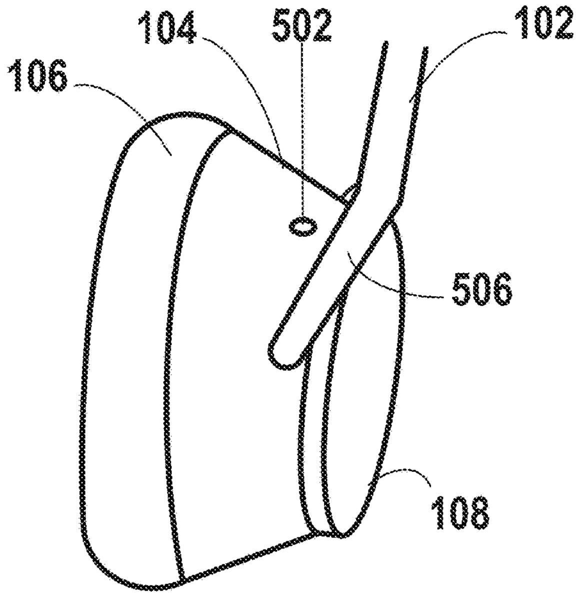
FIG. 5A is a perspective view of an example of the earpiece of FIG. 1 having a hook-and-screw-type attachment mechanism.
Figure 5B:
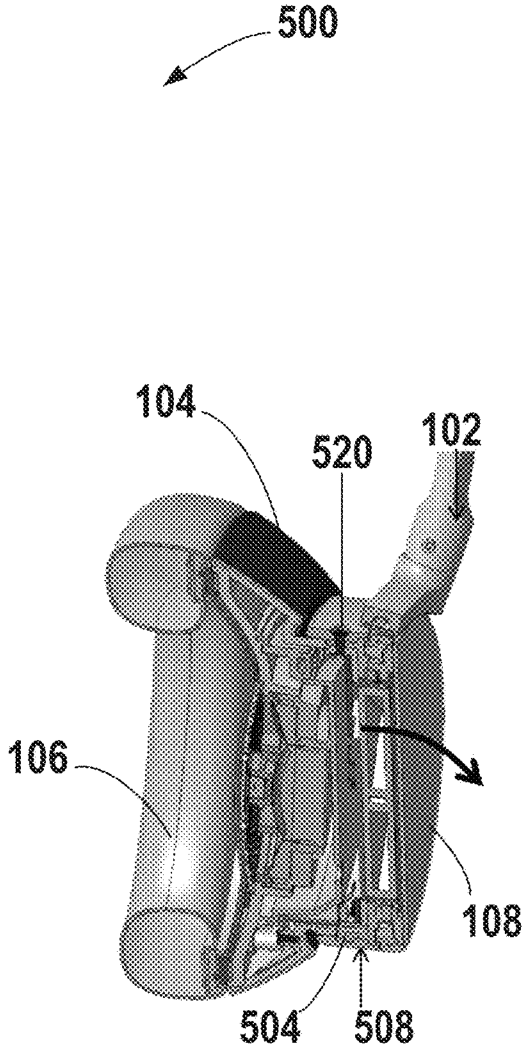
FIG. 5B is a cross-sectional view of the earpiece of FIG. 5A.
Figure 5C:
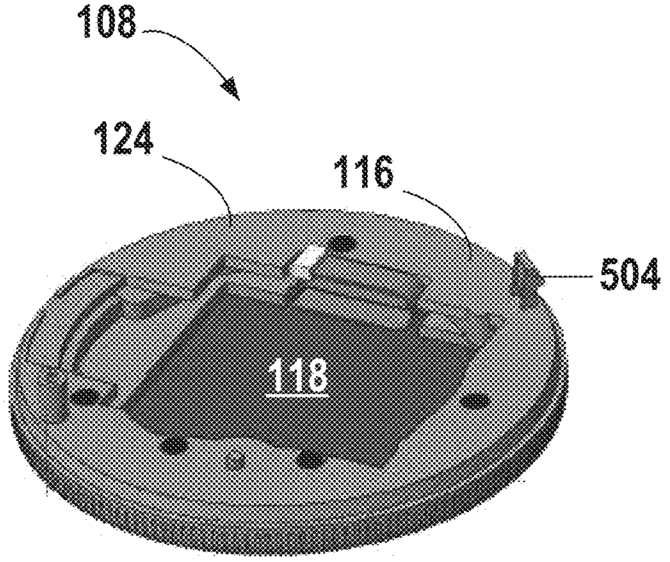
FIG. 5C a perspective view of a modular control wheel having a hook-and-screw-type attachment mechanism.

FIGS. 5A-C are perspective views of earpiece 100 having a first example attachment mechanism 500. Attachment mechanism 500 is a "hook and screw"-type mechanism having a removable screw 520 and a hook 504. As shown in FIGS. 5A and 5B, housing 104 can define a screw-bore 502 at a location that is typically concealed under an arm 506 of the headband 102. In other examples, the screw-bore 502 can be located internally to housing 104, e.g., for aesthetic purposes. While a screw 520 is inserted in the screw-bore 502, control wheel 108 is rigidly coupled to housing 104.

As shown in FIGS. 5B and 5C, a hook 504 extends from interior surface 116 of wheel body 124 of control wheel 108. As shown in FIG. 5B, hook 504 of control wheel 108 is configured to engage with a counterpart tab 508 defined by housing 104 to removably "snap" and retain control wheel 108 in place. To remove control wheel 108 from housing 104, a user may unscrew the screw 520 from the screw-bore 502. The user may then flip open control wheel 108 to disengage hook 504 from tab 508, and separate control wheel 108 from housing 104, thereby accessing internal components, such as battery cavity 118.

Figure 6A:
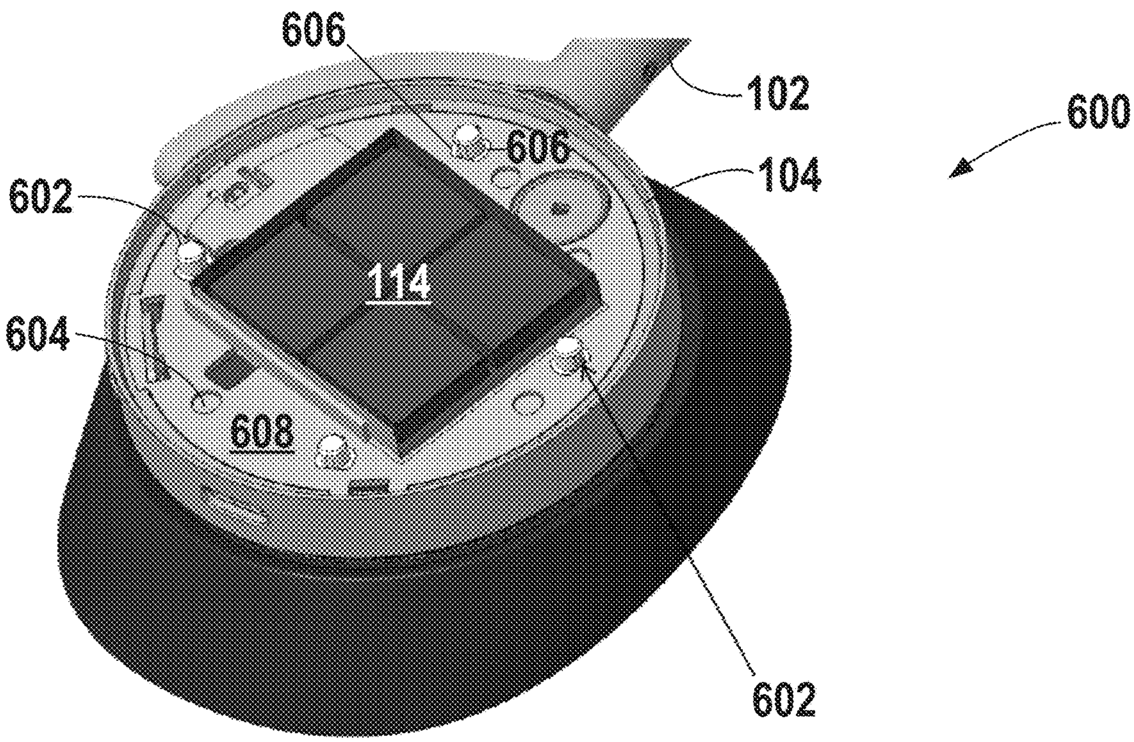
FIG. 6A is a perspective view of an example of the earpiece of FIG. 1 having a metal-pin-and-magnet-type attachment mechanism, with the modular control wheel removed.
Figure 6B:
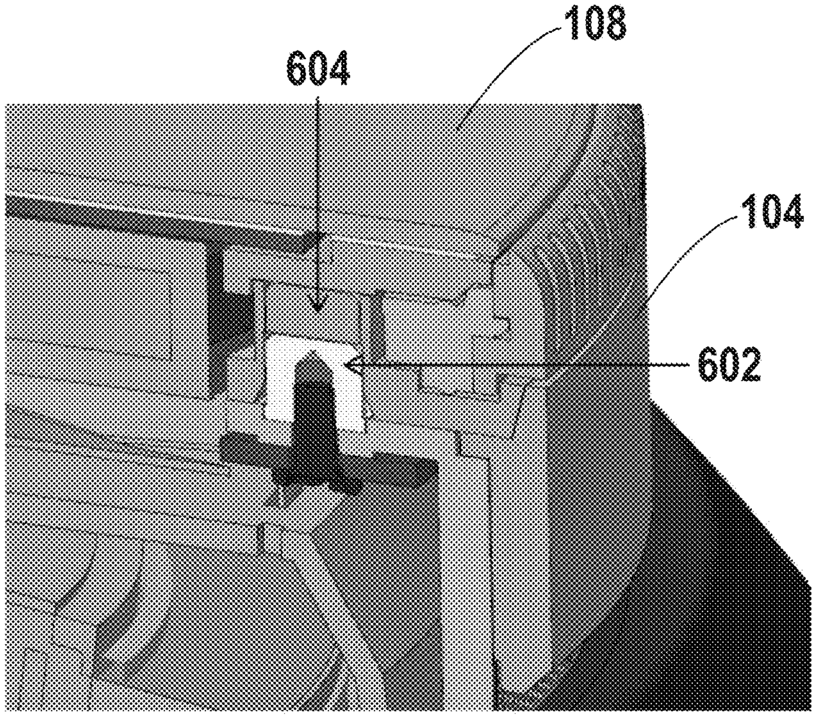
FIG. 6B is a cross-sectional view of the earpiece of FIG. 6A, with the modular control wheel attached.

FIGS. 6A and 6B are perspective views of earpiece 100 having a second example attachment mechanism 600. Attachment mechanism 600 is a "metal pin and magnet"-type attachment mechanism. As implied by the name, housing 104, control wheel 108, or both, can include one or more metal pins 602, each configured to align with a counterpart magnet 604 on the opposite component. The magnetic attractive force between the one or more magnets 604 and corresponding metal pins 602 holds the control wheel 108 in place. In the example shown in FIG. 6A, earpiece 100 includes four pins 602 and four magnets 604, however, the any suitable number and/or arrangement of pins and magnets can be used to supply the necessary force to hold the control wheel 108 in place, e.g., based on the size and weight of control wheel 108.

To remove the control wheel module 108, a user need only manually "unplug" the control wheel module 108 from housing 104, separating the one or more magnets 604 from the metal pins 602. In some examples, as shown in FIG. 6A, metal pins 602 may have winged protrusions 606 that prevent the wheel body 124 from rotating. Wheel body 124, and housing 104 remain coupled, while control wheel 108 is "unplugged" from the components to access inner components, such as battery cavity 118.

Figure 7A:
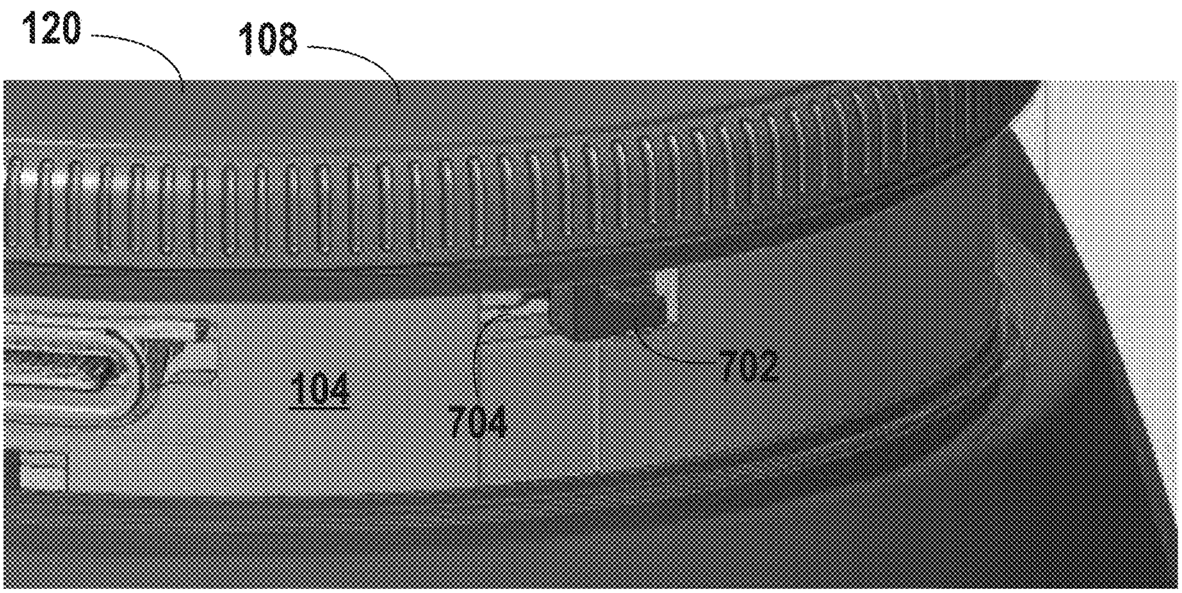
FIG. 7A is a perspective view of an example of the earpiece of FIG. 1 having a bayonet-type connection mechanism.
Figure 7B:
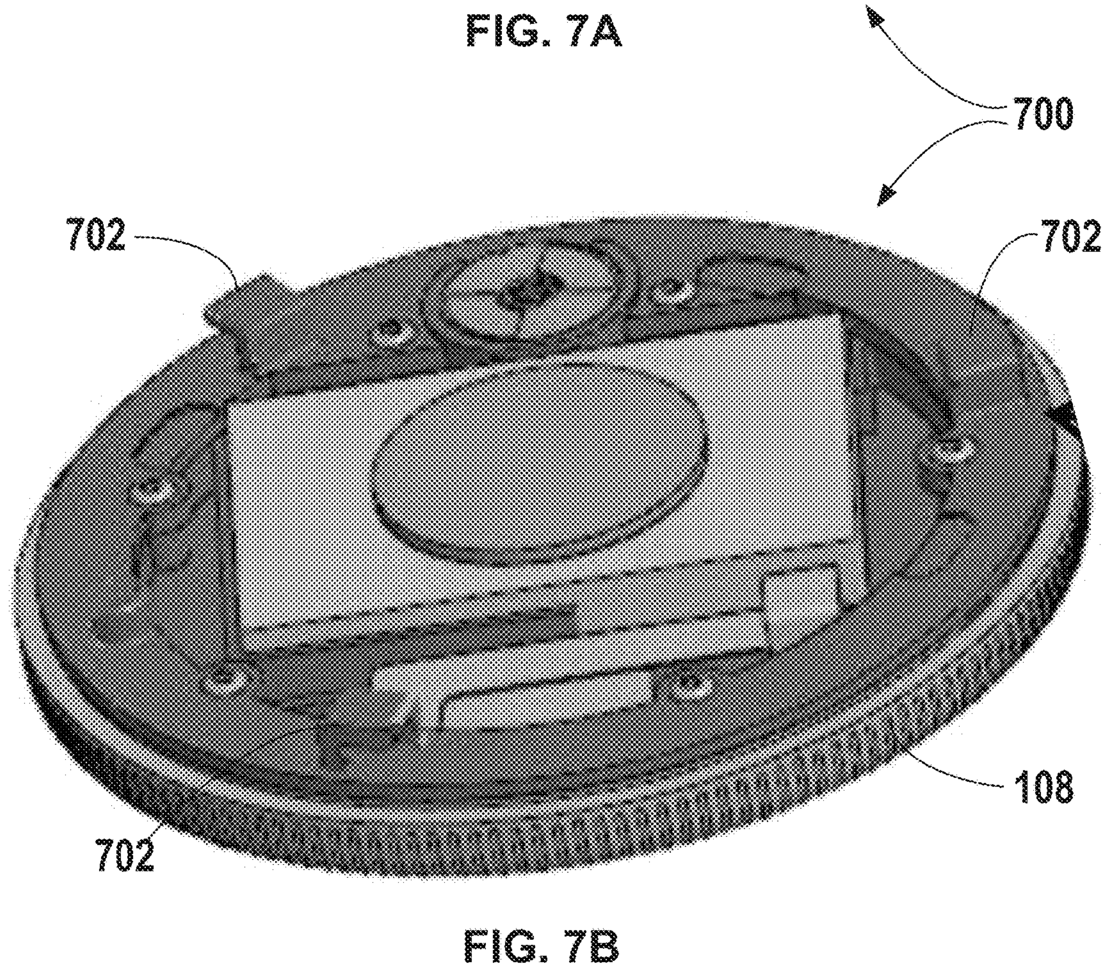
FIG. 7B is a perspective view of the modular control wheel of the earpiece of FIG. 7A.

FIGS. 7A and 7B are perspective views of earpiece 100 having a third example attachment mechanism 700. Attachment mechanism 700 is a bayonet-type mechanism, in which control wheel 108 includes one or more bayonet grips 702 configured to insert into corresponding slots or grooves 704 on the housing 104 of earpiece 100. The connection is made with a twist and a compression force of one piece into the other (i.e., press and twist), of the bayonet grips 702 into the one or more grooves or slots. In some such examples, the precision alignment of these tight-tolerance components ensures the interior face 116 of the control wheel 108 is parallel, and flush against the corresponding interior surface 608 (FIG. 6) of the housing 104.

To removably attach control wheel 108 to the housing 104, the user simply aligns bayonet grips 702 with the corresponding slots 704, and then twists the flat exterior surface 120 relative to housing 104 to lock them together. To remove control wheel 108, the user presses on the flat exterior surface 120 of the control wheel 108 and in the opposite direction to dislodge and disconnect it from the housing 104. The flat exterior surface 120 may twist in a clockwise, or counterclockwise direction, depending on the placement of the bayonet grips 702. Wheel body 124 only need to rotate by about 5 to 8 degrees for the control wheel 108 to attach/detach from the housing 104.

Figure 8A:
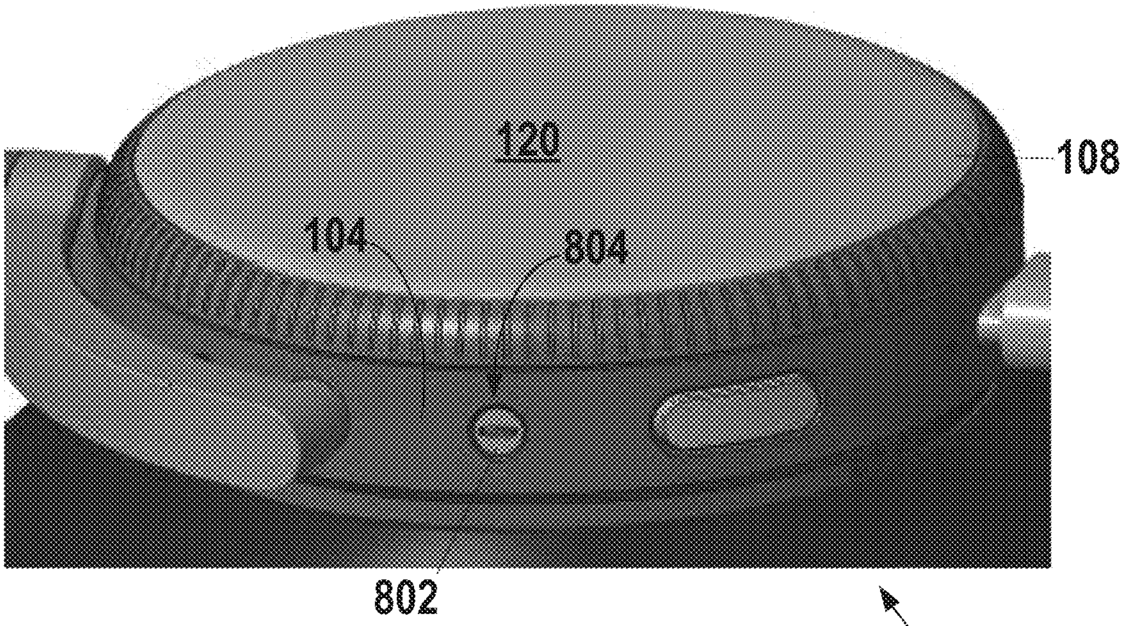
FIG. 8A is a perspective view of an example of the earpiece of FIG. 1 having a screw-type connection mechanism.
Figure 8B:
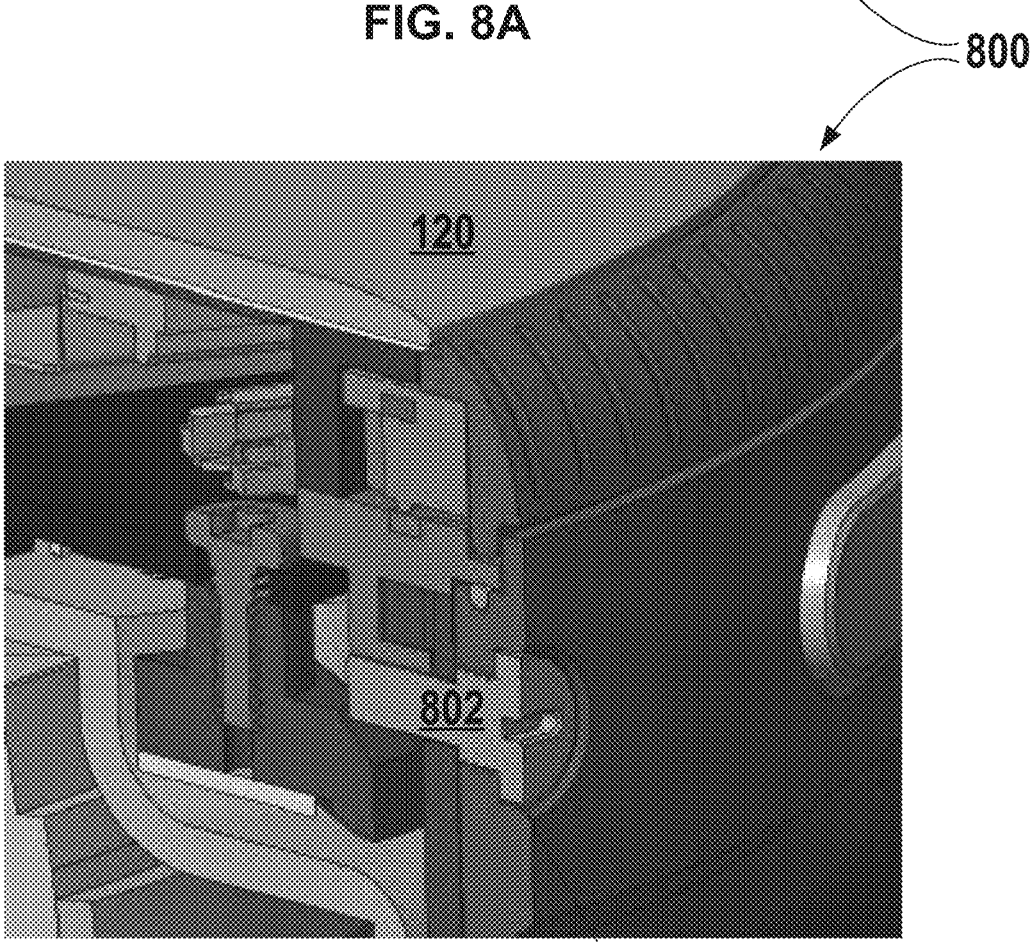
FIG. 8B is a cross-sectional perspective view of the earpiece of FIG. 8A.

FIGS. 8A and 8B are perspective views of earpiece 100 having a fourth example attachment mechanism 800. Attachment mechanism 800 is a connection mechanism using a screw 802. As shown in FIG. 8A, screw 802 may be inserted into a screw-bore 804 disposed on the side of the housing 104 of the earpiece 100, locking control wheel 108 into place on the front housing 104. Screw 802 may be sealed and insulated, e.g., with a rubber layer within screw-bore 804. To remove control wheel 108, the user need only use a screwdriver or other suitable tool to remove the screw 802 from the front housing 104, and "unlock" control wheel 108 from the front housing 104 of the earpiece 100.

In certain examples, placement of screw-bore 804 on the perimeter of the front housing 104 can serve both functional and aesthetic purposes. For instance, external placement of screw-bore 804 enables convenient access to screw 802 and removal of control wheel 108. Further, positioning screw-bore 804 on the side or perimeter of housing 104 isolates the attachment mechanism 800 from other internal components of housing 104, thereby reducing the impact on the overall functional design of earpiece 100.

In a fifth example attachment mechanism (not shown), earpiece 100 includes a pin configured to insert into the front housing 104, thereby locking control wheel 108 in position. The earpiece 100 can include a rubber lock to seal over the head of the pin and isolate acoustic vibrations produced by the earpiece 100. To remove control wheel 108, e.g., to replace battery 114, the user can pull the front housing 104 away from the rubber lock to expose the head of the pin, which may then be removed. Similar to the examples discussed above, placement of the pin on an external surface of the earpiece 100 allows for convenient removal of control wheel 108 without any dismantling. Further, the pin may be concealed as in the first and fourth examples, and not affect the overall design of the earpiece 100.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. An earpiece for a pair of audio headphones, the earpiece comprising:

a housing having an internal side and an external side, the housing defining a cavity comprising one or more electronic components and a speaker unit;

a removable battery, within the housing, configured to power the one or more electronic components;

an ear cushion disposed on the internal side of the housing; and a control wheel comprising a wheel body and a wheel disc, the control wheel configured to removably couple to the external side of the housing, wherein:

rotation of the wheel disc relative to the wheel body provides user-input to the one or more electronic components to control at least one audio function of the earpiece; and removal of the control wheel from the housing provides user-access to the cavity within the housing and to the removable battery within the housing.

2. An earpiece for a pair of audio headphones, the earpiece comprising:

a housing having an internal side and an external side, the housing defining a cavity comprising one or more electronic components and a speaker unit;

a removable battery configured to power the one or more electronic components;

an ear cushion disposed on the internal side of the housing; and a control wheel comprising a wheel body and a wheel disc, the control wheel configured to removably couple to the external side of the housing, wherein:

an interior surface of the control wheel defines a recess configured to retain the removable battery, rotation of the wheel disc relative to the wheel body provides user-input to the one or more electronic components to control at least one audio function of the earpiece, removal of the control wheel from the housing provides user-access to the cavity within the housing and to the removable battery within the recess, and while the removable battery is retained within the recess, and while the control wheel is removed from the housing, the control wheel is configured to function as a remote volume control for an audio signal output by the speaker unit.

3. The earpiece of claim 1, wherein a perimeter of the wheel disc defines a plurality of frictional grooves configured to facilitate the rotation of the wheel disc relative to the wheel body.

4. The earpiece of claim 1, wherein the housing defines a screw-bore configured to receive a screw, and wherein the screw is configured to couple the control wheel to the housing.

5. The earpiece of claim 4, wherein an interior surface of the wheel body comprises a hook configured to engage with the external surface of the housing to removably couple the control wheel to the housing.

6. The earpiece of claim 4, wherein the earpiece is configured to couple to a headband such that the headband conceals the screw while the earpiece is coupled to the headband.

7. The earpiece of claim 1, wherein an interior surface of the wheel body is configured to magnetically couple to the external surface of the housing.

8. The earpiece of claim 7, wherein the interior surface of the wheel body comprises one or more magnets each configured to magnetically attract a respective metal pin disposed on the external surface of the housing.

9. The earpiece of claim 8, wherein each respective metal pin comprises a winged protrusion configured to inhibit rotation of the wheel body relative to the housing while the control wheel is magnetically coupled to the housing.

10. The earpiece of claim 1, wherein an interior surface of the wheel body comprises at least one bayonet-type protrusion configured to engage with a slot defined by the housing to removably couple the control wheel to the housing.

11. The earpiece of claim 10, wherein the at least one bayonet-type protrusion comprises three protrusions distributed circumferentially around the interior surface of the wheel body.

12. The earpiece of claim 1, wherein the control wheel is further configured to provide haptic feedback to a user.

13. The earpiece of claim 1, wherein rotation of the wheel disc relative to the wheel body controls a volume of an audio signal output by the speaker unit while the control wheel is coupled to the housing.

14. The earpiece of claim 1, wherein an exterior surface of the wheel disc comprises a touch-sensitive user-input surface.

* * * * *